United States Patent [19]

Meyers et al.

[11] Patent Number: 4,589,312

[45] Date of Patent: May 20, 1986

[54] AUTOMATIC SHADE CUTTER

[75] Inventors: Frederick C. Meyers, Hinsdale; David B. Mann, Clarendon Hills, both of Ill.

[73] Assignee: Joanna Western Mills Company, Chicago, Ill.

[21] Appl. No.: 582,463

[22] Filed: Feb. 22, 1984

[51] Int. Cl.[4] .......... B23B 3/26; B23B 5/14

[52] U.S. Cl. .......... 82/47; 82/48; 82/52; 82/63; 82/70.2; 82/92; 82/99 A

[58] Field of Search .......... 82/46, 47, 48, 52, 59, 82/63, 60, 101, 70.2, 92, 2 E, 20, 99 A, 83, 84

[56] References Cited

U.S. PATENT DOCUMENTS

| | | | |
|---|---|---|---|
| 1,214,575 | 2/1917 | Miller | 82/101 |
| 1,964,984 | 5/1932 | Gast . | |
| 2,326,293 | 8/1943 | Gast | 82/101 |
| 2,326,463 | 8/1943 | Johnston | 82/48 |
| 2,481,446 | 9/1949 | Quijada | 82/48 |
| 2,521,004 | 9/1950 | Gitter | 82/48 |
| 2,888,048 | 5/1959 | Gast et al. | 144/4 |
| 3,064,452 | 11/1962 | Gast, Jr. | 64/5 |
| 3,100,649 | 8/1963 | Gast, Jr. | 279/1 |
| 3,107,564 | 10/1963 | Coker et al. | 82/101 |
| 3,129,621 | 4/1964 | Makowski | 82/59 |
| 3,159,071 | 12/1964 | Bateman | 82/101 |
| 3,494,230 | 2/1970 | Gast, Jr. | 82/101 |
| 3,715,940 | 2/1973 | Davis | 82/63 |
| 3,760,664 | 9/1973 | Gossling | 82/63 |
| 3,771,393 | 11/1973 | Gatto et al. | 82/53.1 |
| 3,933,347 | 1/1976 | Stoffels | 82/101 |
| 4,172,399 | 10/1979 | Hillesheimer | 82/101 |

FOREIGN PATENT DOCUMENTS

| | | |
|---|---|---|
| 100560 | 3/1937 | Australia . |
| 731442 | 4/1966 | Canada . |
| 402079 | 9/1924 | Fed. Rep. of Germany . |

OTHER PUBLICATIONS

Star Shade Cutter Operating Instructions from Star Shade Cutter Co., St. Joseph, Michigan.

*Primary Examiner*—Francis S. Husar
*Assistant Examiner*—Jerry Kearns
*Attorney, Agent, or Firm*—Mason, Kolehmainen, Rathburn & Wyss

[57] ABSTRACT

An automatic shade cutter for cutting stock width shades to a particular width includes a clamping system for securing the shade in a selected cutting position on a longitudinal axis and a measuring scale positioned for use in selecting the desired width. The apparatus includes a cutting head rotatable about the longitudinal axis of the shade having a knife movable into and out of cutting engagement on a plane normal to the axis of the shade. The automatic shade cutter is designed for use in retail stores for operation by retail customers. A customer first selects a stock shade and then inserts the shade into a measured cutting position in the machine. Thereafter, an automatic cut-off operation is initiated by merely pushing a button and when the cutting operation is completed, the shade is removed and an end plug or pivot is inserted in the freshly cut end and a hem slat of appropriate length is inserted into the hem along the lower edge of the shade.

22 Claims, 6 Drawing Figures

FIG. 1
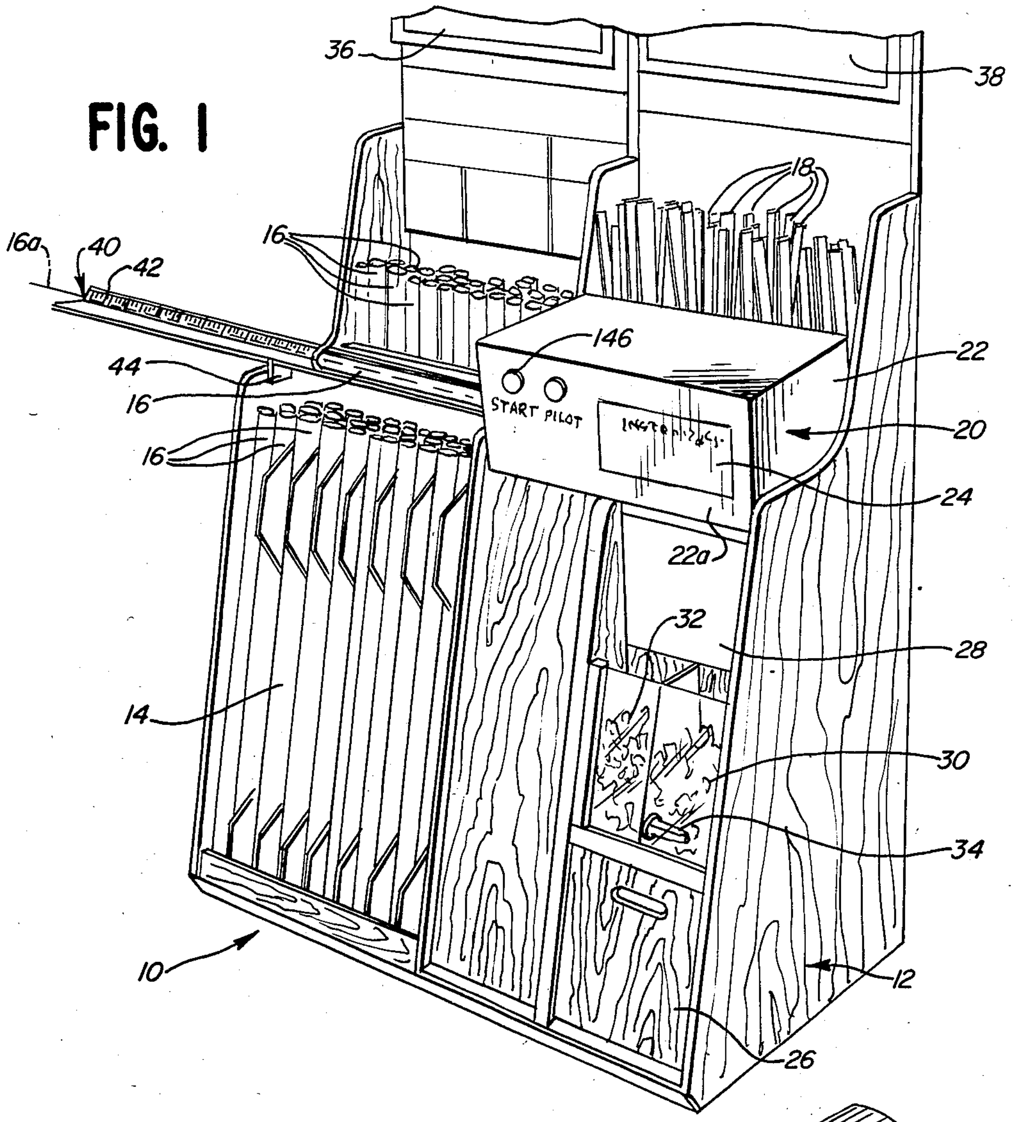
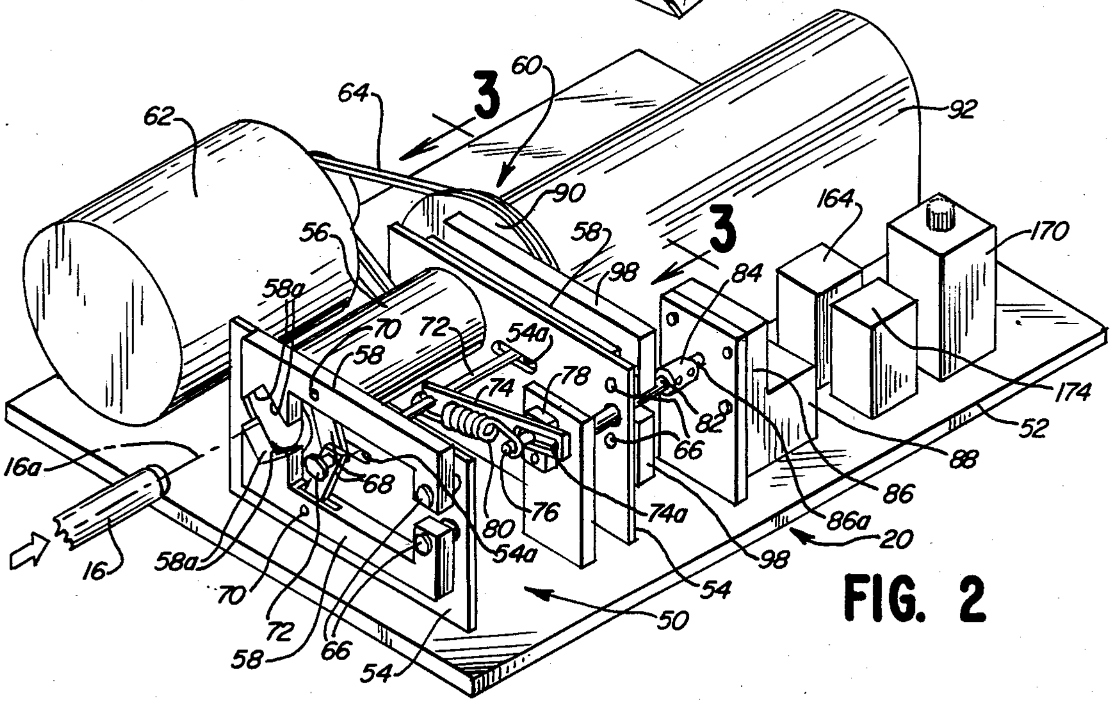
FIG. 2

AUTOMATIC SHADE CUTTER

BACKGROUND OF THE INVENTION

A. Field of the Invention

The present invention relates to a new and improved automatic shade cutter and more particularly to an automatic shade cutter designed for use in retail establishments for operation by a customer without the need for a clerk or other store personnel. The customer first selects a stock shade and inserts the shade into a measured cutting position in the machine for cut-off to a particular width in accordance with the customer's requirement. The automatic shade cutter provides a safe, reliable and automatic system for accurately cutting shades to width and eliminates the need for a retail clerk or other personnel to be available for cutting a shade to a customer's required width.

B. Description of the Prior Art

Over the years, a wide variety of solutions have been proposed and tested in order to deal with the problem of sizing a window shade to a particular width. A "Star" shade cutter, manufactured and sold by Star Shade Cutter Company of St. Joseph, Michigan, is commonly found in many retail establishments that sell window shades. The "Star" cutter is a lathelike apparatus and a certain degree of skill is required. "Star" shade cutters are generally not suitable for use by retail customers alone without aid from store personnel because of exposed rotating parts and cutting mechanisms.

U.S. Pat. Nos. 1,214,575; 1,964,984; 2,326,293; 2,888,048; 3,064,452; 3,100,649; 3,107,564; 3,129,621; 3,159,071; 3,494,230; 3,679,109 3,715,940; 3,933,347; and 4,172,399 relate to various types of window shade cutters and devices for trimming elongated articles to selected widths. In addition, Canadian Pat. No. 731,442; German Pat. No. 402079 and Australian Pat. No. 100560 relate to cutting mechanisms for trimming various types of material to width.

The problem of sizing window shades to a particular width has also been addressed by providing shades having prescored lines in the shade fabric to facilitate manual tearing or peeling away an edge portion to leave the remaining portion at a desired width. U.S. Pat. Nos. 4,006,770; 4,102,383; 4,102,384; 4,102,385 relate to this type of product.

U.S. Pat. No. 4,157,108 discloses a shade roller with a plurality of severable ring elements which may be removed as desired to provide a shade roll of desired width and U.S. Pat. No. 4,139,043 discloses a window shade hem slat which can be broken off along lines of weakness to a desired width in order to fit a particular width of shade.

In more recent years, shade rollers have been formed of convolute, paper stock tubes rather than wood dowels and a wide variety of removable end plugs or terminals have been developed, for example, such as those shown in U.S. Pat. Nos. 3,362,461 and 3,340,922.

OBJECT OF THE INVENTION

It is an object of the present invention to provide a new and improved automatic shade cutter and more particularly an automatic shade cutter for use in retail establishments wherein a retail customer alone can operate the cutter in a safe and efficient manner to cut a shade to a particular width.

Yet another object of the present invention is to provide a new and improved automatic shade cutter of the character described which does not require the presence of a retail clerk or other store personnel for service or supervision of a retail customer when cutting a shade to width.

Yet another object of the present invention is to provide a new and improved window shade system wherein a stock shade may be accurately cut to a desired width automatically in a safe efficient and fast manner.

Yet another object of the present invention is to provide a new and improved automatic shade cutter which is safe, reliable and accurate in operation for providing "cut-to-width" stock shades for retail customers.

Yet another object of the invention is to provide a new and improved automatic cutter head for cutting stock width shades to a particular size.

Another object of the invention is to provide a new and improved method of making a window shade of a particular width and more particularly, a method of providing a cut-to-width shade of a selected width.

BRIEF SUMMARY OF THE INVENTION

The foregoing and other objects and advantages of the present invention are accomplished in a new and improved automatic shade cutter for cutting stock width window shades to a particular size as required by a retail customer. The automatic cutter includes a clamping system for securing the shade in cutting position along a longitudinal axis and a measuring scale is provided so that a retail customer may accurately position the window shade by inserting the end to be cut off into the machine with the outer end aligned at a desired mark or width on the scale. After the shade is clamped firmly in cutting position, a cutting head is energized to rotate about an axis of the shade. The cutting head includes a knife which moves inwardly on a plane normal to the axis of the shade to engage and cut the shade material and roller. After the cut-off is complete, the knife retracts outwardly as the cutting head stops rotation and the accurately "cut-to-width" stock shade may be withdrawn from the machine. An end or terminal plug for pivotal support of the shade is inserted into the cut-off end and a hem slat matching the width of the shade is provided for insertion into the hem pocket of the shade.

BRIEF DESCRIPTION OF THE DRAWINGS

For better understanding of the present invention, reference should be had to the following description taken in conjunction with the drawings in which:

FIG. 1 is a front perspective elevational view of a new and improved automatic shade cutting apparatus constructed in accordance with the features of the present invention;

FIG. 2 is a front elevational perspective view of a clamping mechanism and cutting head of the apparatus shown with a protective cover removed;

DESCRIPTION OF A PREFERRED EMBODIMENT

Figure 1A:
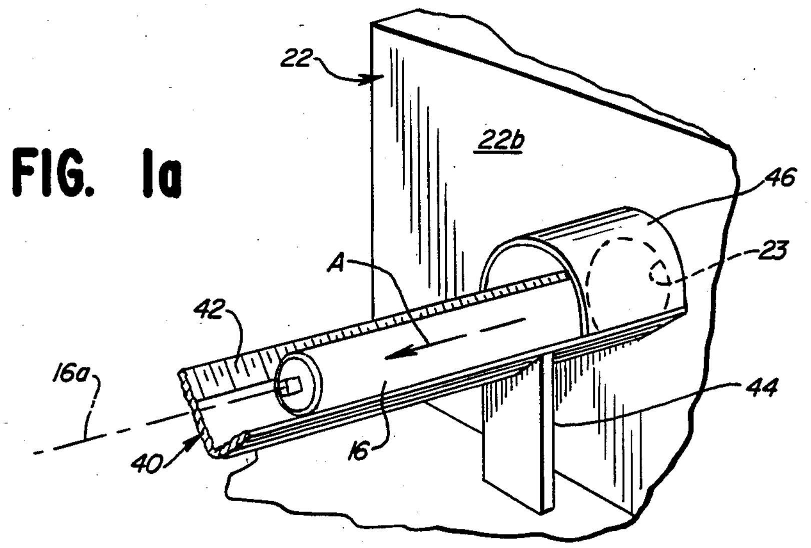
FIG. 1*a* is a fragmentary elevational perspective view of an upper lefthand side portion of the apparatus illustrating a stock shade inserted into the apparatus in position for cutting.

Referring now more particularly to the drawings, in FIG. 1 is illustrated a new and improved automatic shade cutter constructed in accordance with the features of the present invention and referred to generally by the reference numeral 10. The automatic shade cutter is especially designed and adapted for use by retail customers in "self-service" or other types of retail establishments selling window shades. For this purpose there is provided an attractive "point-of-sale" cabinet 12 having a storage and display space 14 for a plurality of stock width shades 16 of several different standard widths which are adapted to be cut to a particular width as selected and measured by a retail customer. In addition, the storage cabinet 12 includes a display and storage space for elongated hem slats 18 preferrably of the type shown and described in U.S. Pat. No. 4,139,043. These type of hem slats may be conveniently severed along prescored lines of weakness to a length to match that of the shades after being cut to width.

The cabinet also provides support for a shade cutter assembly 20 (FIG. 2) mounted at a convenient working level and equipped with a rectangular shaped, removable cover or enclosure 22 having a front wall 22*a* and a decal or plate 24 having operating instructions thereon for the retail customer. Below the cutter head assembly a removable drawer-like receptacle 26 is provided for cut-off end portions of the shades. The receptacle is open at the upper end in order to receive the cut-off end portions of the shade dropping downwardly from the cutter assembly through a discharge chute 28 mounted in the cabinet.

Forwardly of the front wall of the chute 28 is provided a pair of storage bins 30 and 32 for containing a supply of end terminals or pivots 34 which may be of the type generally shown in U.S. Pat. No. 3,362,461 and adapted to be inserted into the hollow cut-off end of a shade 16 after cutting to width has been completed.

The cabinet 12 is also provided with an upstanding backwall on which are mounted panels or displays 36 and 38 for providing sales and operating information to a retail customer for the selection of a stock shade of the proper size along with detailed instructions in order to facilitate the use and operation of the automatic shade cutting system in accordance with the present invention.

The automatic shade cutter 10 includes an elongated trough 40 of V-shaped transverse cross section which is adapted to support and guide a stock shade 16 aligned in horizontal position along an axis 16*a* for insertion into the cutter assembly 20 for cutting to width. A measuring scale or rule 42 is fixedly mounted on a side of the trough facing outwardly for easy viewing by the customer to facilitate positioning of the shade along the longitudinal axis into a cutting position ready to be cut to a particular width as measured on the scale. The trough is supported from the cabinet on a pair of upstanding brackets 44 and terminates short of a left hand sidewall 22*b* of the enclosing cover 22 of the cutter assembly. A short, rounded hood section 46 is provided adjacent the sidewall 22*b* to aid in guiding the end portion of a shade 16 which is to be cut to width in the cutter assembly. The cover sidewall 22*b* is formed with an opening 23 of circular cross section in order to permit insertion of a shade into the cutter assembly 20 for cut-off. The opening 23 is in general coaxial alignment with the V-shaped trough 40 and axis 16*a*.

Stock width shades of a type including a convolute paper shade roll with a shade motor at one end and a tightly wrapped shade cloth enclosed in a tightly wrapped plastic cover are provided and a retail customer initially selects a stock width shade of the proper width to be cut-off to a shorter measured width. The opposite end portion of the selected shade is then inserted into the opening 23 of the cover 22 and the outer or motor end of the shade is aligned with a selected mark on the scale 42 of the V-shaped trough 40. Each mark or scale gradation represents the width of the shade after a cut-off operation is completed. When the shade is in a cutting position ready for cutting to the width as measured on the scale, the clamping and cut off operation is initiated. A clean and accurate cut-off of the external wrapping material (if not removed), the convolute paper shade roll tube and the shade cloth fabric is effected on a cutting plane normal to the elongated axis 16*a* of a shade aligned on the V-shaped trough.

The cutter assembly 20 includes a clamping assembly 50 for securely holding a shade 16 in a selected cut-off position during a cut-off operation and includes a rotating cutter head 60 driven by an electric motor 62 for effecting the cut. The cutter head is driven by an endless V-belt 64 to rotate at approximately 600 RPM.

As shown in FIG. 2, the cutter assembly includes a large rectangular base plate 52 for supporting a pair of upstanding, parallel brackets 54. The brackets 54 are perpendicular to and spaced longitudinally apart along the axis 16*a* (FIG. 2) and are secured to one another by appropriate structural elements which may include a hollow tubular element 56 in coaxial alignment around the shade axis 16*a* and/or other interconnecting members. Each bracket provides support for an upper and a lower clamping jaw 58 and each jaw is mounted for pivotal movement on a pivot axle 66 as shown in FIG. 2. Each clamping jaw includes a V-shaped clamping surface 58*a* adapted to contact and tangentially grip a shade. Each pair of upper and lower jaws move in unison to accurately center a shade to be cut in coaxial alignment along the axis 16*a* while the cut-off operation takes place. Depending upon the size of the shade selected, the outer diameter may vary somewhat and this variation is readily accommodated by each pair of cooperating jaws 58 which move toward and away from one another in unison and closely center the shade on the preferred cutting axis 16*a*. In addition the shade is clamped at longitudinally spaced apart positions thereon adjacent the end portion to be cut off and is thus firmly secured during the cutting operation.

The jaws 58 are pivotal about their respective mounting pins 66 and are moved between a shade clamping position wherein the V-shaped clamping surfaces 58*a* are in holding engagement with a shade and a release position spaced far enough radially outwardly of the axis 16*a* to disengage the surfaces 58*a* of the upper jaws from clamping contact with the shade. After the cut-off is complete and the jaws are moved to a release position, the cut-off shade can be removed from the machine by longitudinal withdrawal from the cutting assembly in an outward direction as shown by the arrow "A" in FIG. 1*a*. Normally, the clamping jaws 58 are at rest in the outer or release position until being actuated to clamp and hold a shade in cutting position while a cut is being completed.

Movement of each pair of clamping jaws 58 between a clamping and a release position is controlled by pairs of toggle link members 68 pivotally secured to the respective jaws with pins 70. Each pair of toggle links is pivotally interconnected together by a common pin or actuating bar 72. The elongated actuating bar is parallel of the shade axis 16*a* on a common horizontal plane therewith and is moveable toward and away from the shade axis 16*a* to open and close the clamping jaws. The bar is guided for horizontal movement in a pair of horizontal slots 54*a* formed in the support brackets 54 to ensure coplanar movement of the bar with respect to the longitudinal axis of a shade in cutting position.

When the jaw actuating bar 72 is moved and positioned toward the inner end of the slots 54*a* that are closest to the shade axis 16*a*, the clamping jaw surfaces 58*a* are spread far apart to release the shade, whereas, when the bar 72 is moved and positioned toward the opposite or outer ends of the slots 54*a*, the clamping surfaces of the jaws are moved into a shade clamping position. Movement of the bar 72 is controlled by a connecting member 74 having an elongated slot 74*a* for driving engagement with a rotating crank pin 76 carried adjacent an outer end portion of a crank arm 78.

The connector 74 is attached to the jaw control bar 72 midway between opposite ends thereof so that the bar tends to move in parallelism with the shade axis 16*a* as the jaws are moved between clamping and release positions. A coil spring 80 is interconnected between the bar 72 and the crank pin 76 to continually bias the bar toward the crank pin and thus resiliently bias the jaw clamping surfaces 58*a* against a shade 16 while in cutting position. In this manner, shades of varying outer diameters can be handled without adjustment of the clamping members or linkage and, even though stock shades of different outer diameters are cut, each shade is maintained in substantial coaxial alignment with the common axis 16*a* regardless of the size. The slot 74*a* of the connector link provides a lost motion function so that the bias spring is effective to resiliently urge the clamps to engage shades of different outer diameters.

The crank arm 78 is mounted adjacent to the end of a motor driven crank axle 82 which is connected at an opposite end through a coupling 84 to the output shaft 86*a* of a gear reducer 86 driven by an electrically powered motor 88. The motor is energized periodically to turn the crank arm 78 in increments of one-half a revolution or 180°. When the crank arm is pointed directly toward the bar 72 the clamping jaws are moved to the shade release position and when the arm is pointed directly away from the bar 72, the clamping jaws 58 move into the clamping position to secure the shade while the cut-off is made. Both pairs of clamping jaws 58 move together and because the jaws are spaced apart longitudinally of the shade, the shade is firmly supported while the cut is made near the plane of the cut.

Figure 3:
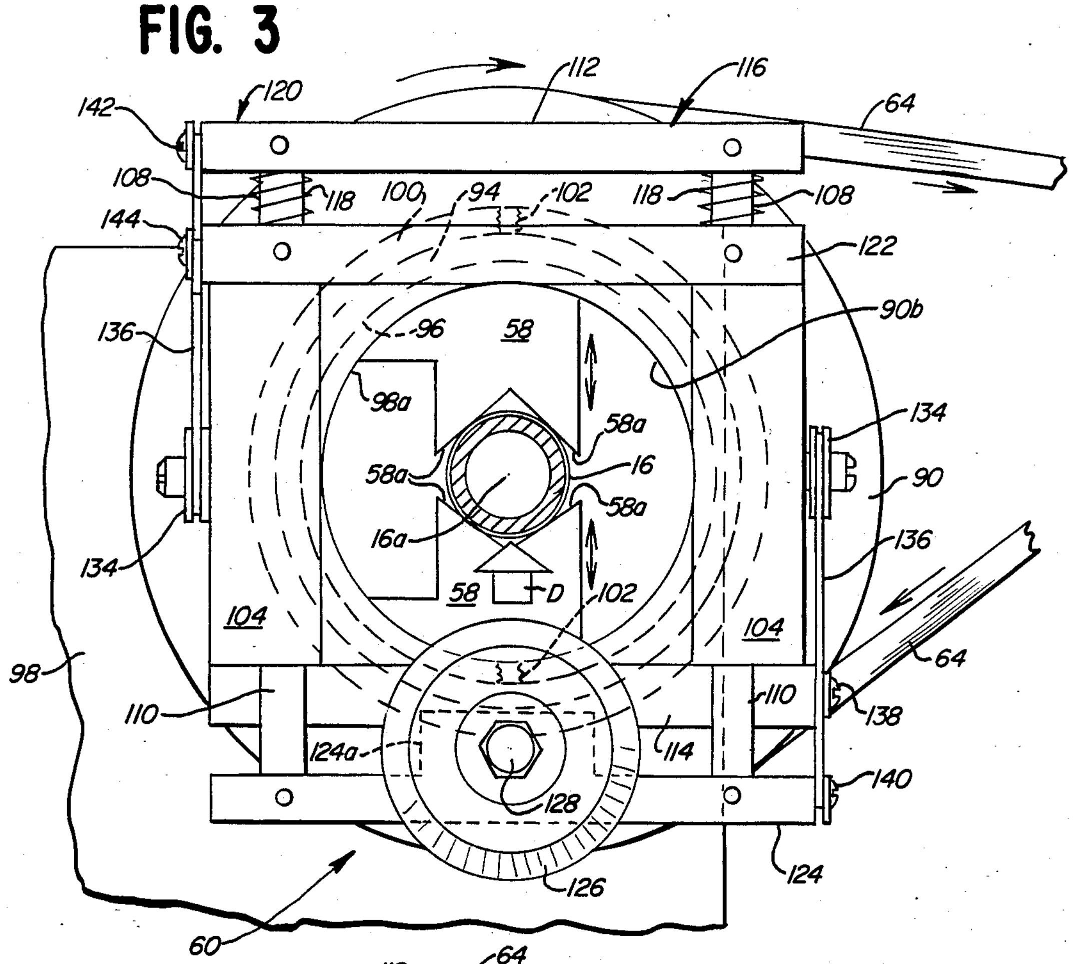
FIG. 3 is a transverse cross sectional view taken substantially along lines 3—3 of FIG. 2.

In accordance with an important aspect of the invention, the cutter head 60 includes a circular base 90 having a V-groove 90*a* in the outer edge for receiving the endless drive belt 64. As shown in FIG. 3, the annular base is formed with a central opening 90*b* in coaxial alignment with the axis 16*a* in order to permit an end portion of a shade to be extended through the opening into a cut-off area. The cutoff area is enclosed by a hood or cover 92 directly above the upper end of the discharge chute 28 which leads to the removable receptacle 26. After a cut is completed, the cut-off portion falls downwardly into the receptacle and the cover 92 insures that the cutoff portion does not fly upwardly or outwardly as the final portion of the cut is completed.

The annular cutter base 90 is supported for rotation about the shade axis 16*a* on a bearing ring 94 (FIG. 4) mounted on a circular sleeve support 96. The sleeve projects from the outer face of a vertical bracket 98 secured to the base plate 52 in spaced parallel relation to the brackets 54. A concentric sleeve 100 is provided on the inner face of the cutter base 90 and is attached to the outer race of the bearing ring 94 with set screws 102 which are also used to secure the inner race of the bearing ring to the sleeve support 96.

On the outer face of the annular base 90 there is provided a pair of parallel bearing support blocks 104 on opposite sides of the central aperture 90*b*. Each bearing block is provided with a pair of elongated, inner and outer bores or passages 104*a* and 104*b*, respectively, which run parallel to one another and are parallel of the outer face of the annular base 90. At opposite ends of each bore, a suitable bearing sleeve 106 is mounted in order to support movable or sliding inner and outer rod elements 108 and 110, respectively, for axial reciprocal movement in the bores.

The inner rods 108 on opposite sides of the central aperture 90*a* of the base are interconnected at opposite ends by a pair of transverse flyweight elements 112 and 114 which together with the rods form a rectangular frame or structure 116 around the aperture 90*b*. The frame is movable on a plane radially of the axis 16*a* toward and away from a shade in cutting position and is biased in an upward direction (as viewed in FIGS. 3 and 4) by a pair of coil springs 118 carried on the inner rods 108 between the flyweight 112 and the sleeve bearings 106 at the upper end of the bearing blocks.

A similar, outer rectangular frame 120 is formed by the outer rods 110 and a pair of transverse flyweights 122 and 124 innerconnect opposite ends of the rods. The flyweight 124 is provided with a knife support portion 124*a* at the center and a circular shaped cutting knife or disc 126 is secured to the knife support by means of a headed cap screw 128 and "Bellville" type spring washer 130 which resiliently biases the cutter disc or knife 126 against a bearing washer 132 disposed between the inner face of the disc and the outer face of the knife support portion 124*a*. Resilient pressure exerted by the spring washer 130 is sufficient to frictionally resist any substantial rotation of the cutting disc on the shank of the cap screw 128 as a cut is made, but the cap screw is adjusted to permit limited movement of the disc so that each time a new shade is cut, a fresh portion of the edge of the circular disc will be available.

Figure 4:
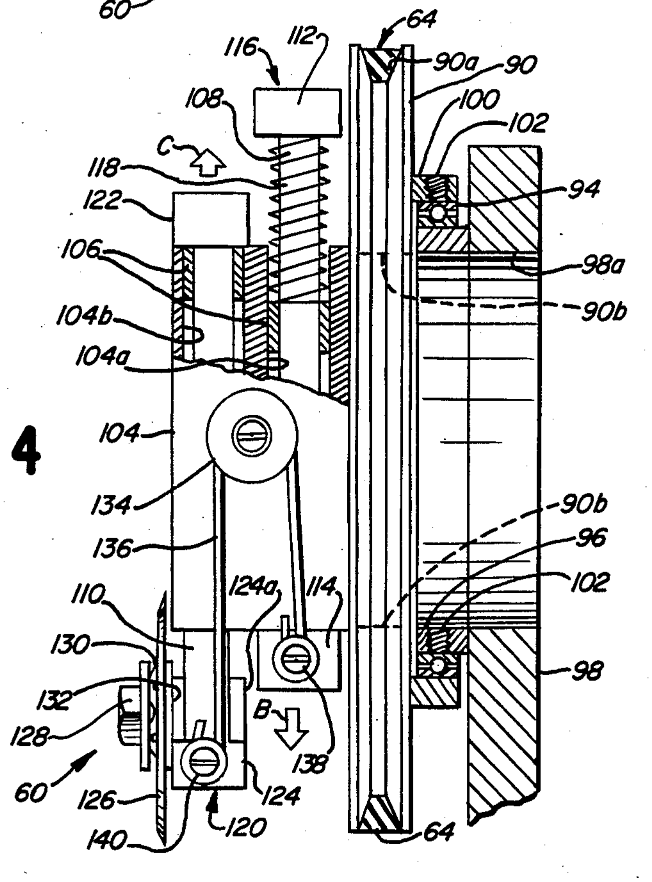
FIG. 4 is a side elevational view looking in the direction of arrow 4—4 of FIG. 3.

As viewed in FIGS. 3 and 4, the cutting knife 126 is illustrated in a non cutting position wherein an inwardly facing edge portion of the disc is spaced well outwardly of the outer surface of the shade 16 held in clamping position ready for a cut. When the base 90 is rotated by energizing the drive motor 62, centrifugal force acting on the inner and outer frames 116 and 120 respectively causes the inner frame to move in the direction of the arrow "B" (FIG. 4) and the outer frame moves in the opposite direction as indicated by the arrow "C". This in turn carries the cutting disc 126 radially inwardly as shown by the arrow "D" in FIG. 3 to effect a cut-off of the shade 16 that is held in centered position.

The respective inner and outer frames are innerconnected to move in opposite directions in order to provide a balanced dynamic cutting head and for this purpose, on each of the bearing blocks 104 is mounted a rotatable pulley 134 having an outer groove to accomodate a flexible cable 136. As viewed in FIGS. 3 and 4, one end of a right side flexible cable 136 is secured to the flyweight 114 by a cap screw 138 and an opposite end of the flexible cable is secured to the flyweight 124 on the outer frame 120 by a cap screw 140. A lefthand flexible cable (FIG. 3) is secured at one end to the flyweight 112 on the inner frame by a cap screw 142 and an opposite end of the cable is secured to the flyweight 122 on the outer rectangular structure 120. Innerconnecting of these inner and outer frames by the flexible cables 136 provides balanced movement so that as one rectangular frame structures moves inwardly from one direction toward the central axis 16*a* the other frame member moves in an opposite direction thus tending to maintain overall a dynamic balance for the rotating cutter head 60.

The flyweights 112 and 122, and 114 and 124 are chosen with weight values such that the cutter disc 126 will move in the direction of the arrow "D" whenever the cutter head is driven to rotate by the V-belt 64. When the electric motor powering the V-belt is subsequently deenergized and rotation begins to slow down, the bias springs 118 are sufficient to overcome the centrifugal force as it diminishes, to return the cutter disc outwardly to the position shown in FIGS. 3 and 4 in readiness for the next cycle of cut-off operation. Because the rectangular structures 116 and 120 move in opposite directions to approximately centered positions around the axis 16*a* when the cutter head is rotating, the general overall dynamic balance of the cutter head 60 is maintained and minimal vibratory forces are generated even though the cutting disc or knife 126 moves inwardly in a radial direction to cut off a shade.

Figure 5:
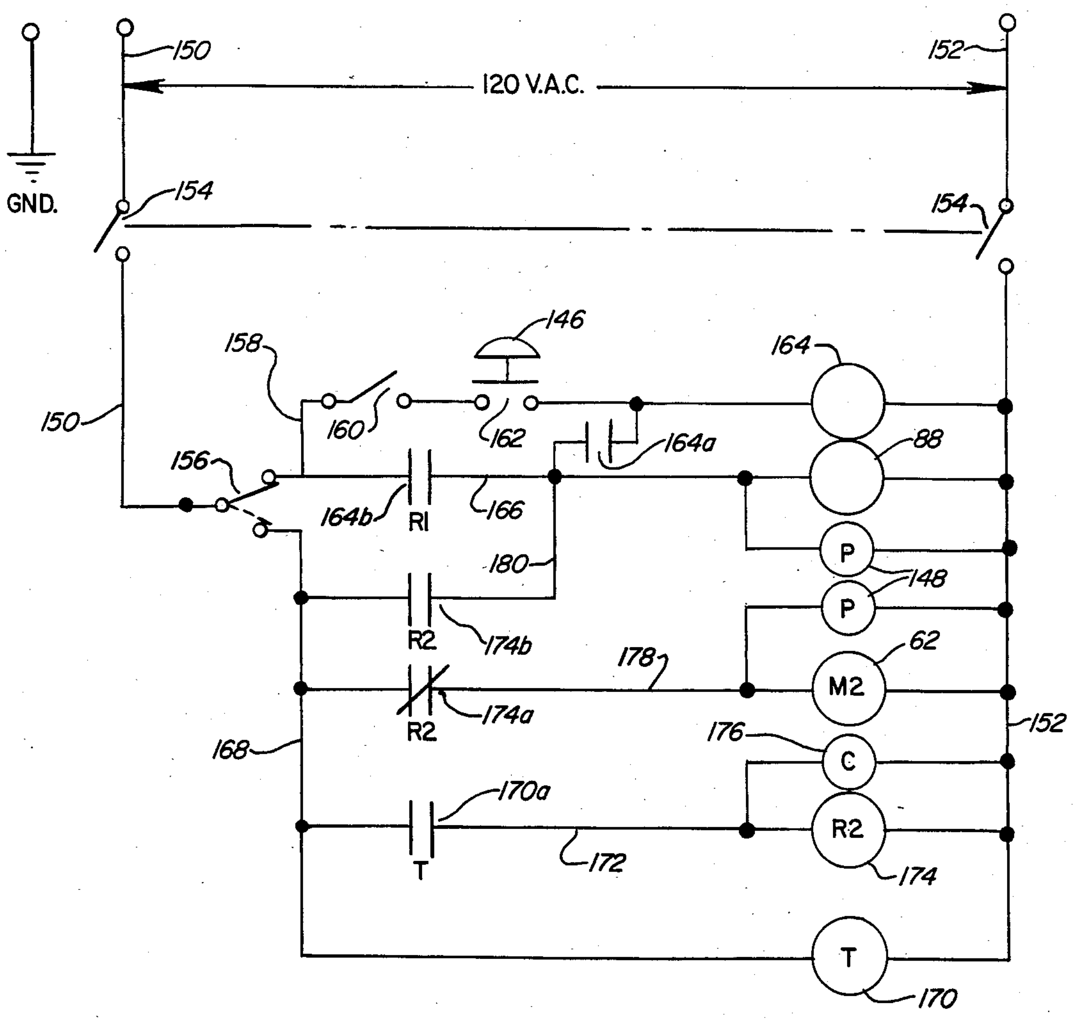
FIG. 5 is an electrical schematic diagram of an electrical circuit of the automatic shade cutting apparatus.

Referring now to FIGS. 1 and 5, the automatic shade cutter 10 is provided with an external, "start" button 146 mounted on the outer wall 22*a* of the cover 22 for convenient use by a retail customer after a shade has been positioned and measured ready for cutting by insertion into the cutting apparatus. A pilot light 148 is also mounted on the front wall 22*a* of the cover to indicate that a cutting cycle has been initiated and is still in progress.

Referring to FIG. 5, 120 volt AC power is supplied from a convenient source such as a wall receptacle to AC lines 150 and 152 and a pair of safety switches 154 are provided in each line to prevent operation of the automatic shade cutter 10 unless the cover 22 is in place fully enclosing the operating mechanism 20. The safety switches 154 comprise microswitches conveniently located with operating arms adapted to be engaged by the cover only when the cover is in proper position.

The circuit includes a cam control function switch 156 which is activated by a cam provided on the crank arm control shaft 82 or by the crank arm 76 itself and this switch is a single pole double throw switch which is in the position shown for supplying power to a line 158 whenever the clamping jaws 58 are in a release position with the crank arm 78 pointing toward the control bar 72. The circuit line 158 is connected in series with a shade detector microswitch 160 which is activated whenever a shade 16 is inserted into cutting position to close the contacts and supply power to one of the contacts of a switch 162 in series therewith. The switch is momentarily activated by depression of the push button 146 by retail customer.

Once the presence of a shade is detected by activation of the switch 160 and subsequently the pushbutton 146 is depressed to close the contacts of switch 162, a relay 164 is energized closing a pair of normally open contacts 164*a* and 164*b* to complete an alternate circuit 166 to maintain the relay 164 in an energized condition, even though the momentary pressure on the pushbutton 146 is released. When the alternate circuit line 166 is energized, power is supplied to energize the clamping drive motor 88 and light up the pilot light 148 to indicate that a cycle has been initiated.

As the clamping motor 88 runs, the crank arm 78 is rotated 180° until the cam control switch 156 is moved to an alternate position shown in dotted lines wherein power supplied to the relay 164 and motor 88 is cut off. With the switch 156 in the alternate position, power from the line 150 is supplied to a line 168 which energizes a timer delay relay 170 which controls a pair of switch contacts 170*a* in a line 172.

When the line 172 is energized, power for a relay 174 and a cycle counter 176 is supplied. When power is supplied to the line 168 the cutter head drive motor 62 is also energized through a pair of normally closed relay contacts 174*a* in a line 178. Energization of the line 178 provides continued power for operating the pilot light 148 while the cutter head motor 62 is rotating and making a cut. As soon as a selected and adjustable time period runs out on the time delay relay 170 the normally closed contacts 170*a* are actuated to a closed condition which energizes the relay 174 and cycle counter 176. The time delay relay usually is set for around 12 seconds.

When the relay 174 is energized, the normally closed contacts 174*a* are opened so that power is shut off to the line 178 de-energizing the cutter head drive motor 62. As this occurs, the cutter head begins to slow toward a stop and the cutting knife 126 returns to the outer or noncutting position because of the bias springs 118. Energization of the relay 174 also closes normally open contacts 174*b* for energizing a line 180 to supply power to the line 166 which in turn energizes the clamping drive motor 88 and maintains the pilot light 148 in a lit condition. As the drive motor 88 moves the clamping jaws 58 to the unclamping position the cam control switch 156 is returned to the original or starting position (solid lines in FIG. 5) which deenergizes the line 168 and accordingly shuts off power to the relay 174 permitting the contacts 174*b* to return to the normally open condition. As this occurs, the motor 88 stops rotating and the pilot light 148 goes off indicating that the entire cycle has been completed and the shade may be withdrawn. Subsequent automatic operating cycles may then be commenced by placement of a shade in cutting position to activate the shade detector switch 160 and momentarily depressing the start button 146.

It will thus be seen that the automatic shade cutter 10 in accordance with the present invention provides a unique system whereby shades of several stock widths may be cut to precise measured widths by a retail customer without the necessity of a clerk or other supervisory personnel. The cuts can be made automatically in a clean and accurate manner by merely following simple instructions provided at the point of sale display. The automatic cutter is extremely safe and reliable in operation and provides "cut-to-width" shades on a very economical basis to the retail customer. Moreover, the retail establishments do not have to provide a clerk or supervisory person to be present at the point of sale.

Although the present invention has been described with reference to a single illustrated embodiment thereof, it should be understood that numerous other modifications and embodiments can be made by those skilled in the art that will fall within the spirit and scope of the principles of this invention.

What is claimed as new and is desired to be secured by Letters Patent is:

1. Apparatus for automatically cutting off elongated, rolled-up window shades to a particular width, comprising:

base means for supporting operative working components of said apparatus at a convenient working level;

clamping means supported from said base means for securing a shade in a cutting position on one side of a transverse cut-off plane along a longitudinal axis ready for cut-off;

measuring means including a measuring scale extending along said axis for use in selecting a cutting position of said shade for cutting to said particular width;

cutting head means supported from said base means adjacent said clamping means and rotatable about said axis including knife means rotatively movable on a plane normal to said axis between a first position radially outwardly of said shade and a second position inwardly thereof for cutting engagement with said shade while said shade is secured in said selected cutting position along said axis, said cutting head means including means for biasing said knife means toward said first positon and means responsive to rotation of said cutting head means for moving said knife means into said second position for cutting said shade to said particular width;

drive means supported from said base means for rotatively driving said cutting head means when energized;

operator means for moving said clamping means between a clamping position for securing said shade in a clamping position while said drive means is energized to cut said shade and a release position permitting longitudinal withdrawal of said shade out of cutting position;

trough means extending outwardly from said cutting head means on said one side of said cut-off plane along said longitudinal axis and adjacent said measuring scale for supporting a shade during measurement and before and after cut-off when said clamping means is in said release position, removable cover means normally enclosing said clamping means and said cutting head means during operation and including an opening aligned with said trough means for receiving an end portion of shade inserted therein to be cut-off by said cutting head;

automatic control means for (1) activating said operator means to move said clamping means from said release position toward said clamping position after measuring said shade along said measuring means and placement thereof in a selected cutting position along said axis, (2) energizing said drive means to drivingly rotate said cutting means to cut-off said shade while said clamping means is in said clamping position securing said shade in said selected cutting position, (3) deenergizing said drive means after said shade is cut-off, and (4) thereafter activating said operator means to move said clamping means to said release position permitting said cut-off shade to be withdrawn from said apparatus; and push button means for enabling a consumer to activate said automatic control means to cut-off said shade to the desired width.

2. The apparatus of claim 1, wherein:

said clamping means includes a plurality of clamping devices spaced apart longitudinally of said axis on said one side of said cut-off plane wherein the cut-off portion of said shade can drop free when the cut is completed.

3. The apparatus of claim 2 wherein:

one of said clamping devices is spaced closely to said normal plane and a second of said clamping devices is spaced remote thereof along said axis toward said measuring means.

4. The apparatus of claim 1 wherein:

said clamping means includes at least one pair of clamping jaws movable in a plane normal to said axis between a release position and a clamping position for securing said, shade in coaxial alignment along said axis.

5. The apparatus of claim 4 including:

resilient means for biasing said clamping surfaces in holding engagement against said shade while said clamping means is in said clamping position.

6. The apparatus of claim 1 wherein:

said cutting head means includes;

an annular base having a central aperture in coaxial alignment with said axis for accommodating an shade to be cut extending along said axis through said base and cutting plane.

7. The apparatus of claim 6 wherein:

said cutting head means includes;

knife support means mounted on said base for movement toward and away from said axis on one side thereof, and flyweight means mounted on said base for movement away from and toward said axis on an opposite side thereof upon rotation of said cutting head means while cutting an shade to a particular width.

8. The apparatus of claim 7 wherein:

said flyweight means and knife support means are mounted for linear movement on said annular base toward and away from opposite sides of said shade being cut.

9. The apparatus of claim 7 wherein:

said flyweight means includes a plurality of balance weights mounted for movement outwardly away from said shade being cut in response to centrifugal force developed by rotation of said cutting head means.

10. The apparatus of claim 9 including:

connector means between said balance weights and said knife support means for drawing said knife means from said first position toward said second position in response to rotation of said base.

11. The apparatus of claim 7 wherein:

said knife means comprises a disk having a circular cutting edge for engaging said shade; and spring means for securing said disk on said knife support means to permit rotation thereof to provide different segments of said cutting edge for subsequent cutting engagement with said shades.

12. The apparatus of claim 9 wherein:

said flyweight means includes a pair of rectangular structures having open central portions about said apertures of said base and spaced longitudinally apart from one another along said axis.

13. The apparatus of claim 12 wherein:

each rectangular structure includes a pair of balance weights on opposite sides mounted for sliding movement on said base toward and away from said shade and interconnected by a pair of rods disposed on opposite sides of said aperture.

14. The apparatus of claim 13 wherein:

said knife support means is mounted on a balance weight of one rectangular structure and said knife biasing means is engaged with a balance weight on the other rectangular structure.

15. The apparatus of claim 14 including:

connector means between said rectangular structures for synchronizing movements thereof.

16. The apparatus of claim 15 wherein:

said balance weights of said one rectangular structure and said balance weights of said other rectangular structure are weighted so that said knife support means moves said knife means inwardly to cut an shade in response to rotation of said base.

17. The apparatus of claim 16 wherein:

said knife biasing means is engaged with said other rectangular structure to move said knife means toward said first position whenever said base stops rotation.

18. Apparatus for automatically cutting off elongated, rolled-up window shades to a particular width, comprising:

base means for supporting operative elements of said apparatus at a convenient working level;

clamping means supported from said base means for securing a selected shade in a cutting position along a longitudinal axis ready for cut off;

measuring scale means extending along said axis for use in selecting a cutting position for said shade for cutting to said particular width;

cutting head means supported from said base means adjacent said clamping means and rotatable about said axis including knife means movable in a generally circular path on a plane normal to said axis between a first position outwardly around said shade and a second position inwardly thereof for cutting engagement with said shade while said shade is secured in said seleted cutting position along said axis, said cutting head means including resilient means for biasing said knife means toward said first position and means responsive to rotation of said cutting head means for moving said knife means into said second position for cutting said shade to said particular width, shade support means extending along said measuring scale means for supporting said selected shade during measurement and after cut-off;

removable protective cover means for shielding said clamping means and said cutter means during operation, said cover means including an opening aligned with said shade support means for receiving an end portion of said selected shade to be cut-off;

drive means supported from said base means for rotatively driving said cutting means when energized;

first operator means for moving said clamping means between a shade clamping first position and a second position releasing said shade from clamped engagement;

second operator means for activating said first operator means to effect clamping of said shade prior to cut off and therafter energizing said drive means to drivingly rotate said cutting head means to cut said shade to said particular width;

third operator means for activating said first operator means to release said shade from clamped engagement after cut off is completed; and push button control means for use by a customer for initiating a shade cut-off cycle after placement of said selected shade in said shade support means for measurement, said control means operable to control said first, second and third operator means.

19. The apparatus of claim 18 wherein:

said removalbe protective cover means is adapted to be removable from a shielding position normally shielding said clamping means and said cutter head means during operation, and first safety means for preventing operation of said first and second operator means when said protective cover means is out of said shielding position.

20. The apparatus of claim 18 including:

removable protective cover means for shielding said clamping means and said cutter head means during operation, and first safety means for preventing operation of said first and second operator means when said protective cover means is out of a shielding position.

21. The apparatus of claim 18 including:

means for detecting the presence of a shade in position along said axis ready for cutting; and safety means for preventing operation of said second operator means unless the presence of a shade is detected.

22. The apparatus of claim 18 including timing means for deactivating said second operator means to stop rotation of said cutter head means after said shade is cut.

* * * * *